United States Patent
Roesler et al.

(10) Patent No.: US 6,820,501 B2
(45) Date of Patent: Nov. 23, 2004

(54) DIFFERENTIAL STATIC PRESSURE MEASURING AND ACTIVATING DEVICE AND CONTROL MECHANISM

(75) Inventors: Bruce Roesler, Wixom, MI (US); Adrien de Borchgrave, Canton, MI (US)

(73) Assignee: Dürr Industries, Inc., Plymouth, MI (US)

(*) Notice: Subject to any disclaimer, the term of this patent is extended or adjusted under 35 U.S.C. 154(b) by 59 days.

(21) Appl. No.: 10/212,529

(22) Filed: Aug. 5, 2002

(65) Prior Publication Data

US 2004/0020304 A1 Feb. 5, 2004

(51) Int. Cl.[7] .............................................. G01F 1/46
(52) U.S. Cl. ..................................................... 73/861.66
(58) Field of Search .......................... 73/195, 196, 202, 73/861.42, 861.47, 861.48, 861.65, 861.66, 706, 708, 715, 716, 717, 723, 756

(56) References Cited

U.S. PATENT DOCUMENTS

| | | | | |
|---|---|---|---|---|
| 5,458,006 A | * | 10/1995 | Roqueta | 73/861.42 |
| 5,705,751 A | * | 1/1998 | Briefer et al. | 73/722 |
| 5,879,499 A | * | 3/1999 | Corvi | 156/175 |
| 6,041,659 A | * | 3/2000 | Wilda et al. | 73/720 |

OTHER PUBLICATIONS

PCT/US03/24572 International Search Report, (no date).

* cited by examiner

Primary Examiner—William Oen
(74) Attorney, Agent, or Firm—Howard & Howard

(57) ABSTRACT

A differential static pressure measuring or activating device measuring fluid flow through a duct including two pitot tubes each including a proximal end connected to a valve, a distal end portion located in the duct extending generally parallel to each other and perpendicular to the air flow through the duct having open distal ends and a plate located between the distal end portions of the tubes creating a differential static pressure between the open ends of the tubes. The open distal ends of the tubes incline toward the plate such that the open ends face toward and away from the direction of the gas flow through the duct.

20 Claims, 2 Drawing Sheets

DIFFERENTIAL STATIC PRESSURE MEASURING AND ACTIVATING DEVICE AND CONTROL MECHANISM

FIELD OF THE INVENTION

This invention relates to a static pressure measuring or activating device which measures or is responsive to air flow through a duct, pipe or tube using pitot tubes and a plate to amplify the differential static pressure for more accurate measurement.

BACKGROUND OF THE INVENTION

Pitot tubes are commonly used to measure the stagnation pressure of a flowing fluid such as a gas or liquid. When only one pitot tube is used, the open end of the pitot tube is conventionally directed into the fluid and connected to a pressure-indicating device, such as a pressure gauge. When two pitot tubes are used in combination in a duct containing gas flow, the instrument connected to the pitot tubes may be used to measure the differential static pressure drop and thereby the volume of gas flowing through a duct.

A typical pitot tube static pressure measurement device includes two pitot-type tubes each having a proximal end connected to a pressure transmitter, gauge, switch or the like and a distal end portion extending into the duct generally perpendicular to the gas flow. In one embodiment known in the art, the distal open ends of the tubes are bent or turned 90 degrees, such that the open end of one pitot tube is directed into the gas flow and the open end of the other pitot tube is directed downstream or away from the gas flow.

In certain applications, it is necessary to accurately measure or control the flow of gas through a duct. One application disclosed herein is the control of gas fired burners used to indirectly heat a paint drying oven containing volatile organic compounds which are combustible. The heated gas from the gas fired burner is directed into a heat exchanger and the air in the paint oven circulated through the heat exchanger. The National Fire Protection Association (NFPA) Code requires that the burner be shut off in the event that gas (air) is not flowing through the exhaust duct which receives the air from the heat exchanger and vents the air to atmosphere. In this application, it is necessary to continuously monitor the gas flow through the exhaust duct and shut off the gas burner in the event that the flow of gas through the exhaust falls below a predetermined minimum to avoid a hazardous condition. Conventional pitot tube differential static pressure instruments do not have sufficient accuracy for this and other similar applications and a fixed annular orifice plate is installed in the exhaust duct to amplify the pressure drop for more accurate reading. As will be understood, the installation of a fixed annular orifice plate in the exhaust ducts of a conventional paint drying oven requires materials and labor, particularly where the paint oven includes several heat zones each requiring a gas burner, heat exchanger, exhaust duct, etc.

It would therefore be desirable to improve the accuracy of a conventional pitot tube differential static pressure measurement device to improve its sensitivity and thereby its accuracy.

SUMMARY OF THE INVENTION

As set forth above, the present invention relates to a differential static pressure measuring or actuating device measuring or controlling gas flow through a duct, pipe tube or the like. As used herein, the term "duct" is intended to broadly cover any passage conveying a gas, such as a pipe, tube or duct, wherein it is necessary or desirable to measure or control the flow of gas through the passage. The differential static pressure measuring or actuating device of this invention includes two tubes, commonly referred to as "pitot tubes," each including a proximal end located outside the duct and a distal end portion located in the duct, wherein the distal end portions of the tubes extend generally parallel and perpendicular to the air flow through the duct each having an open distal end. A plate is located adjacent to and between the distal end portions of the tubes and the plate extends beyond the open distal ends of the tubes creating a differential static pressure or pressure drop between the open distal ends of the tubes. A pressure gauge, pressure transmitter or pressure switch is then connected to the proximal ends of the tubes which may be connected to a control, such as a control for a gas fired burner, fan or the like. As will be understood, a pressure transmitter or switch will also include a pressure gauge.

In the preferred embodiment, the open distal ends of the tubes are inclined toward the plate, most preferably toward a distal end of the plate spaced from the open distal ends of the tubes, preferably at an angle of between of 30 and 60 degrees such that the open end of one tube generally faces the gas flow and the open distal end of the other tube faces away from the gas flow. Although the shape of the plate is not believed to be critical, a round plate has been found to be particularly suitable, wherein the distal open ends of the tubes are adjacent the center of the circular plate and the tubes contact the plate. Again, the size of the plate is not considered critical. However, the plate should not interfere with the flow of gas through the duct.

As understood, the improvement in sensitivity and therefore accuracy results from the plate or disk amplifying the differential static pressure between the open distal ends of the tubes. Further, the plate averages out turbulence in the duct. Also, the differential static pressure measuring or activating device of this invention is less expensive to manufacture than conventional pitot tube instruments described above, wherein the distal ends of the tubes are bent outwardly and must be aligned with the gas flow, as described. Further, in the application described above, the fixed annular orifice plate may be eliminated resulting in a more substantial saving in cost in this application. Other advantages and meritorious features of the differential static pressure measuring or activation device of this invention will be more fully understood from the following description of the preferred embodiments, the appended claims and the drawings, a brief description of which follows.

DETAILED DESCRIPTION OF THE PREFERRED EMBODIMENTS

Figure 1:
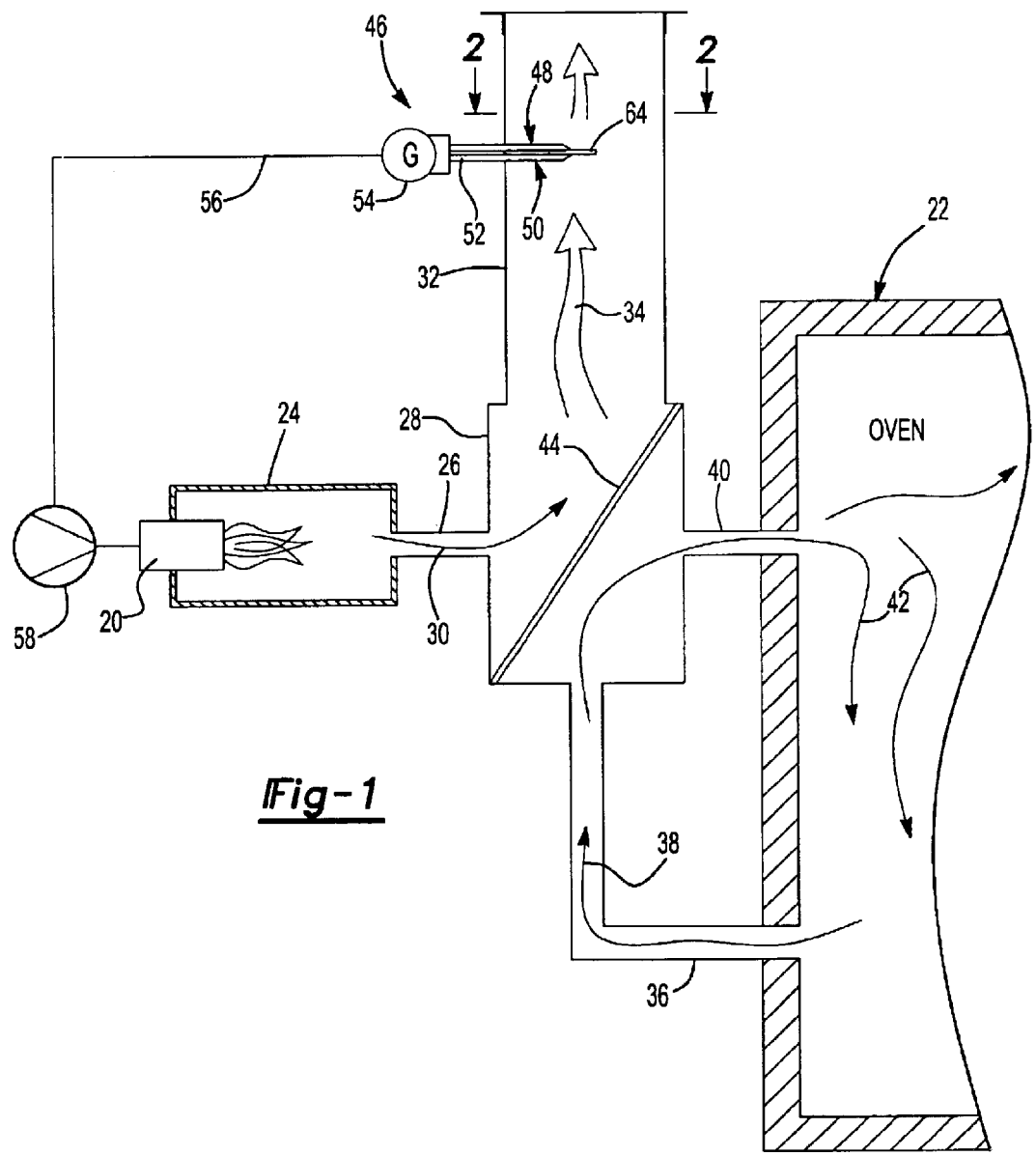
FIG. 1 is a partially schematic side view of one application of the differential static pressure measuring and activation system of this invention utilized to control a gas fired burner for heating an oven.

As described above, the differential static pressure measuring or activating device of this invention may be used for example to measure or control the gas flow through a duct in many applications including, but not limited to the application disclosed in FIG. 1. FIG. 1 illustrates schematically the use of a gas fired burner 20 to indirectly heat a chamber, such as the oven 22 schematically illustrated in FIG. 1. The gas fired burner 20 heats the air in the burner chamber 24 and the heated air is transmitted through duct 26 to a heat exchanger 28 as shown by arrow 30. The heated air in the heat exchanger is transmitted through an exhaust duct 32 as shown by arrow 34. In a typical application, the exhaust duct 32 is vented to atmosphere. The oven 22 is then indirectly heated by circulating air in the oven through outlet duct 36, as shown by arrow 38. The air is then received in the heat exchanger 28 and recirculated to the oven through inlet duct 40 as shown by arrow 42. A fan (not shown) may be used to circulate the air from the oven to the heat exchanger. As will be understood by those skilled in the art, the heat exchanger 28 is separated into at least two chambers by a baffle 44, such that the heated gas from the burner 20 does not come into contact with the air circulated from the oven, particularly where the oven contains combustible gases, such as volatile organic compounds present in a paint drying oven for example.

Further, as described above, the NFPA Code also requires that the burner 20 be shut off in the event that gas (air) is not flowing through the exhaust duct 32. Therefore, the flow of the gas through the exhaust duct must be continuously monitored and the burner 20 turned off in the even that the gas flow through the exhaust duct 32 falls below a predetermined minimum volume or flow rate. The differential static pressure measuring or activating device 46 of this invention will accomplish this function in a simple and reliable construction. The differential static pressure measuring or activating device 46 is shown in more detail in FIGS. 2 to 4 and comprises two pitot-type tubes 48 and 50 each having an proximal end 52 located outside the duct 32 connected to a gauge 54 as shown in FIG. 1. In this embodiment, the gauge 54 is connected by a line 56 to a valve 54 which controls the flow of gas to burner 20. As shown, the proximal ends 52 of the tubes 48 and 50 extend through the wall of the exhaust duct 32.

Figure 2:
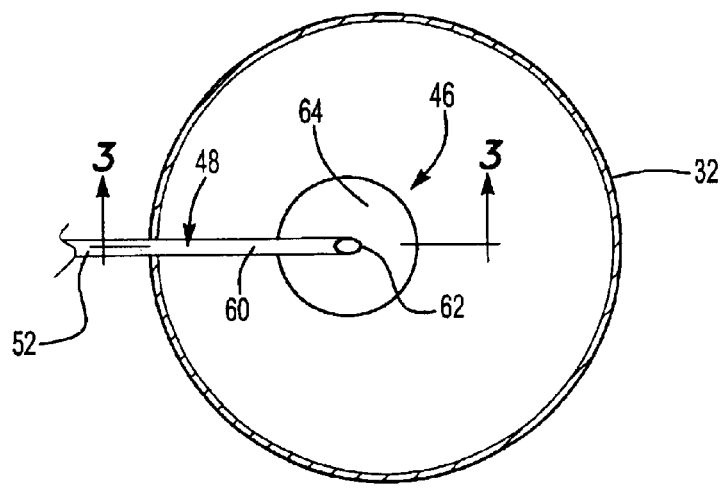
FIG. 2 is a top cross-sectional view of FIG. 1 in the direction of view arrows 3—3.
Figure 3:
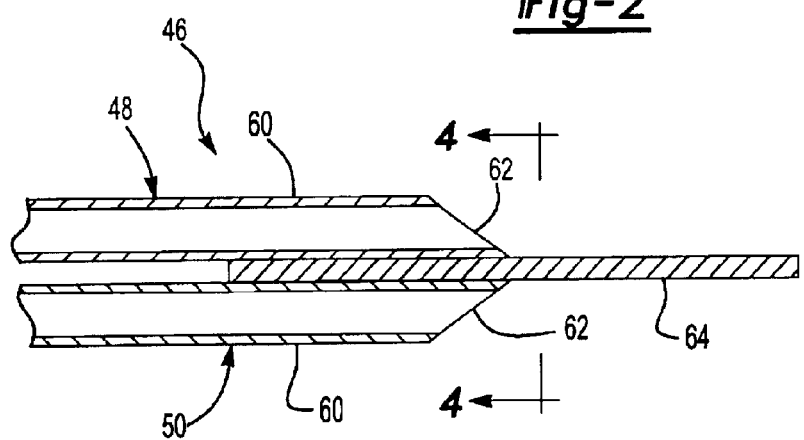
FIG. 3 is a cross-sectional view of FIG. 2 in the direction of view arrows 2—2.
Figure 4:
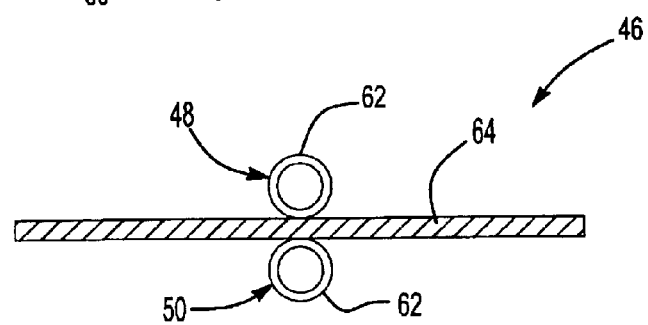
FIG. 4 is an end cross-sectional of FIG. 3 in the direction of view arrows 4—4.

The distal end portions 60 of each of the tubes extend generally parallel as best shown in FIGS. 3 and 4, each including an open distal end 62 as shown in FIGS. 2 to 4. A plate 64 is located between the distal end portions 60 of the tubes 48 and 50 as best shown in FIGS. 3 and 4. As set forth above, the plate 64 creates a differential static pressure on opposed sides of the plate or a pressure drop across the plate which is measured by the pressure gauge 54. When the differential static pressure measured by the pressure gauge 54 through the pitot tubes 48 and 50 falls below a predetermined minimum differential static pressure, the pressure gauge 54 turns off the valve 58, shutting off the burner 20.

In the preferred embodiment of the differential static pressure measuring or activation device 46 of this invention, the open distal ends 62 of the tubes 48 and 50 are inclined toward the plate 64 as shown in FIG. 3 such that the open distal ends 62 open toward and away from the direction of the gas flow as shown by arrow 34 in FIG. 1. Further, although it is believed that the shape of the plate 64 is not critical, it has been found that a circular plate as shown in FIG. 2 provides excellent performance, wherein the open free ends of the tube 62 are adjacent the center of the circular plate. The plate 64 may be welded or otherwise secured to the tubes 48 and 50 or secured by any other suitable means including clamps.

As will be understood from the above description of a preferred embodiment of the invention, the differential static pressure measuring or activating device of this invention may be utilized for many applications to measure or control gas flow through a duct. The oven assembly shown in FIG. 1 is only one example. The pressure gauge 54 of FIG. 1 may simply be a pressure gauge to measure the volume of flow through the duct 32 wherein the gauge is, for example, a magnehelic pressure gauge and may then be used to control the speed of a fan, for example, to maintain a predetermined volume of gas flow for example. The tubes 48 and 50 may be conventional pitot tubes having a ⅜ inch diameter, for example, and may be formed of steel, preferably stainless steel. As set forth above, the plate 64, which may also be formed of steel, amplifies the static differential pressure providing more accurate measurement of the volume of gas transmitted through the duct 32. The gauge 54 may also incorporate a switch which actuates the valve 58 controlling the gas fired burner 20 as disclosed above.

As will understood by those skilled in this art, various modifications may be made to the differential static pressure measuring or activating device of this invention within the purview of the appended claims. For example, the plate 64 may be of any suitable configuration provided it does not obstruct the flow of gas through the duct 32. However, a round plate has been found to provide excellent performance with minimal resistance to gas flow. Finally, it will be understood that only the distal end portions of the tubes which contact the plate are preferably parallel and the remainder of the tubes may be spaced as required by the application. Having described a preferred embodiment of the differential static pressure measuring or activating of this invention, the invention is now claimed as follows.

What is claimed is:

1. A differential static pressure measuring device for measuring fluid flow through a duct, comprising:
   two tubes including proximal end portions located outside said duct and distal end portions located in said duct, said distal end portions of said tubes extending generally parallel to each other and perpendicular to said fluid flow and having open distal ends;
   a plate located adjacent and between said distal end portions of said tubes having a portion extending beyond said open distal ends of said tubes creating a pressure drop across said plate; and
   a pressure gauge connected to said proximal end portions of said tubes measuring said pressure drop across said plate.

2. The differential static pressure measuring device as defined in claim 1, wherein said pressure gauge includes a switch.

3. The differential static pressure measuring device as defined in claim 1, wherein said open distal ends of said tubes are inclined toward said plate.

4. The differential static pressure measuring device as defined in claim 3, wherein said open distal ends of said tubes are inclined toward a distal end of said plate spaced from said tubes.

5. The differential static pressure measuring device as defined in claim 4, wherein said open distal ends of said tubes are angled toward said plate at an angle of about 45 degrees.

6. The differential static pressure measuring device as defined in claim 1, wherein said distal end portions of said tubes contact said plate.

7. The differential static pressure measuring device as defined in claim 1, wherein said plate is round.

8. The differential static pressure measuring device as defined in claim 1, wherein said plate has a major dimension equal to or less than ten percent of a major dimension of said duct.

9. The differential static pressure activating device measuring air flow through a duct, comprising:

two tubes including proximal end portions located outside said duct and distal end portions located in said duct, said distal end portions of said tubes extending generally parallel to each other and perpendicular to said air flow and having open distal ends;

a plate located adjacent to and between said distal end portions of said tubes having a portion extending beyond said open distal ends of said tubes creating a pressure drop across said plate; and a pressure transmitter connected to said proximal end portions of said tubes generating a signal.

10. The differential static pressure actuating device as defined in claim 9, wherein said pressure transmitter includes a pressure gauge and a switch.

11. The differential static pressure actuating device as defined in claim 9, wherein said open distal ends of said tubes are inclined toward said plate.

12. The differential static pressure actuating device as defined in claim 11, wherein said open distal ends of said tubes are inclined toward a distal end of said plate spaced from said open distal ends of said tubes.

13. The differential static pressure actuating device as defined in claim 12, wherein said open distal ends of said tubes are inclined toward said plate at an angle of between 30 and 60 degrees.

14. The differential static pressure actuating device as defined in claim 9, wherein said distal end portions of said tubes contact said plate.

15. The differential static pressure actuating device as defined in claim 9, wherein said plate is round.

16. A control mechanism responsive to gas flow through a duct, comprising:

two tubes including proximal end portions located outside said duct and distal end portions located in said duct, said distal end portions of said tubes extending generally parallel to each other and perpendicular to said gas flow through said duct having an open distal ends;

a plate located adjacent to and between said distal end portions of said tubes having a portion extending beyond said open distal ends of said tubes creating a static pressure drop across said plate; and a pressure transmitter connected to said proximal ends of said tubes responsive to said pressure drop and adapted to control a function of said gas.

17. The control mechanism defined in claim 16, wherein said pressure transmitter is a switch adapted to shut off said gas flow when said pressure drop falls below a predetermined minimum.

18. The control mechanism as defined in claim 16, wherein said pressure transmitter is connected to a fan controlling said gas flow.

19. The control mechanism defined in claim 16, wherein said open distal ends of said tubes are inclined toward said plate.

20. The control mechanism as defined in claim 16, wherein said open distal ends of said tubes are inclined toward a distal end of said plate spaced from said open distal ends of said plate at an angle of between 30 and 60 degrees.

* * * * *